United States Patent
Kang et al.

[11] Patent Number: 5,390,031
[45] Date of Patent: Feb. 14, 1995

[54] CONTROL INFORMATION FORMAT CONSTRUCTION USED IN TRANSMITTING IMAGE INFORMATION

[75] Inventors: Seung I. Kang, Seoul; Cha S. Dong, Kyeongki, both of Rep. of Korea

[73] Assignee: Sindo Ricoh Co., Ltd., Seoul, Rep. of Korea

[21] Appl. No.: 795,717

[22] Filed: Nov. 21, 1991

[30] Foreign Application Priority Data
Nov. 28, 1990 [KR] Rep. of Korea ............... 1990-19411

[51] Int. Cl.$^6$ ............................................. H04N 1/41
[52] U.S. Cl. ........................................ 358/468; 358/261.3
[58] Field of Search ............ 358/426, 468, 470, 261.3; H04N 1/41; 382/56; 379/100; 340/825.44; 370/99

[56] References Cited

U.S. PATENT DOCUMENTS

| | | | |
|---|---|---|---|
| 3,916,095 | 10/1975 | Weber et al. | 358/261.3 |
| 4,414,580 | 11/1983 | Johnsen et al. | 358/261.3 |
| 4,926,266 | 5/1990 | Kurosawa | 358/426 |
| 5,030,948 | 7/1991 | Rush | 340/825.44 |
| 5,058,187 | 10/1991 | Kim | 358/426 |

*Primary Examiner*—Stephen Brinich
*Attorney, Agent, or Firm*—Darby & Darby

[57] ABSTRACT

The invention provides a control information format construction used in image information transmission in a system combining a facsimile device and a computer, having: a head code of one byte for showing start of the control information; a control code of one byte located at just after the head code, including an operation mode control information, a manuscript mode control information, an end control information, and a response control information for error, for showing the kind of control; and a control end code of two bytes located at just after the control code, for showing end of the control information.

5 Claims, 3 Drawing Sheets ( H : HEXA-DECIMAL )

CONTROL INFORMATION FORMAT CONSTRUCTION USED IN TRANSMITTING IMAGE INFORMATION

BACKGROUND OF THE INVENTION

The present invention relates to a control information format used in image information transmission in a system combining a facsimile device and a computer.

Recently, the document and image processing system combining the facsimile device and the computer is being developed in order to process the character together with image information within the system.

The proposals described hereto have been fixed in adding very expensive external device between the facsimile device and the computer

SUMMARY OF THE INVENTION

It is an object of the invention to provide a control information format construction necessary to combine directly the facsimile device and the computer.

To achieve the object, the invention provides a control information format construction used in image information transmission in a system combining a facsimile device and a computer, comprising: a head code of one byte for showing start of the control information; a control code of one byte located at just after the head code, including an operation mode control information, a manuscript mode control information, an end control information, and a response control information for error, for showing the kind of control; and a control end code of two bytes located at just after the control code, for showing end of the control information.

BRIEF DESCRIPTION OF THE DRAWINGS

The above and other objects, features and other advantages of the present invention will be more clearly understood from the following detailed description taken in conjunction with the accompanying drawings in which.

DETAILED DESCRIPTION OF THE PREFERRED EMBODIMENTS

Figure 1:
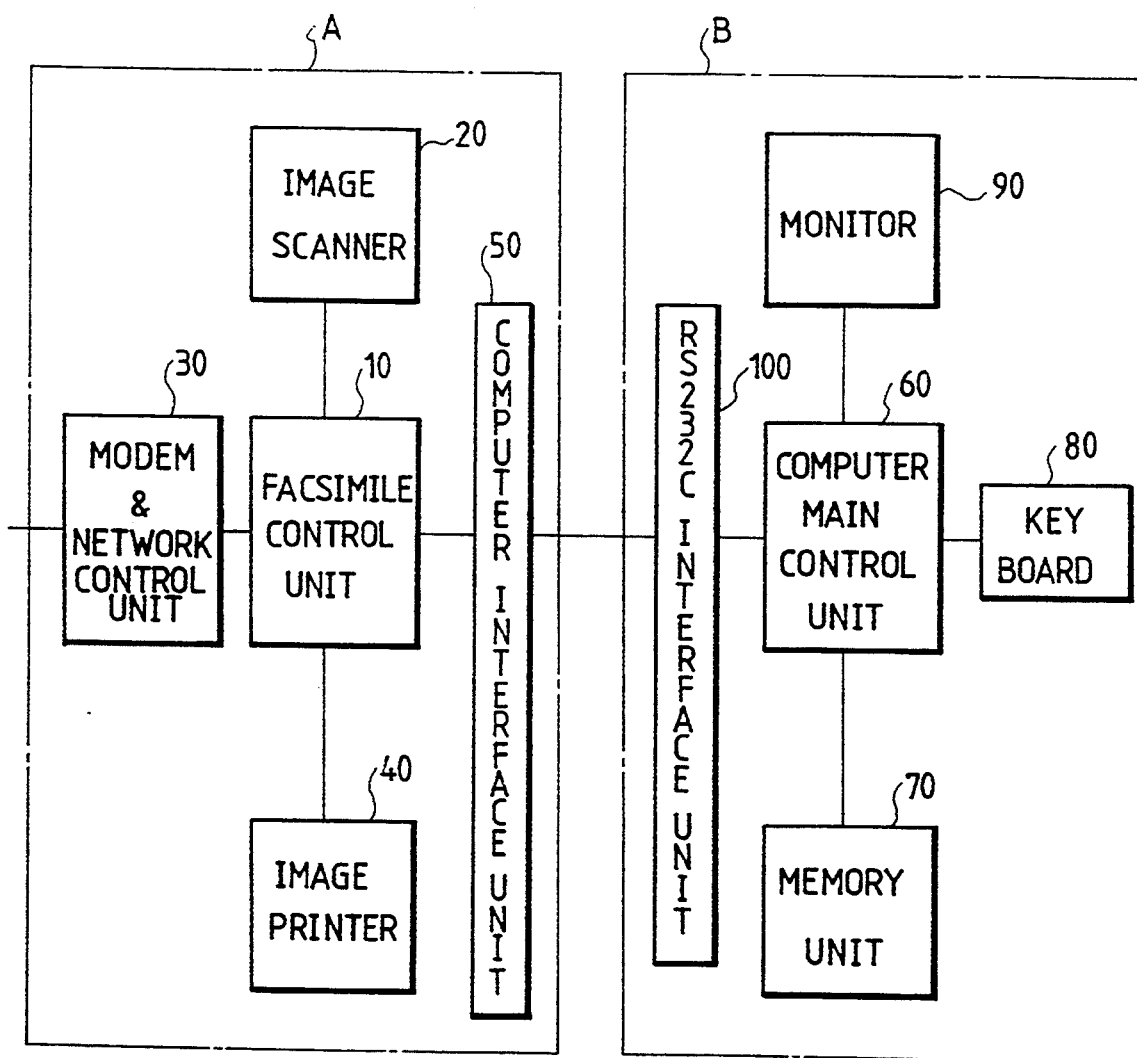
FIG. 1 is a block diagram of showing a connection system between the facsimile device and the computer.

FIG. 1 is a block diagram for showing a connection of a computer and a facsimile device to which this invention is applied, and in FIG. 1, the reference symbol A shows the facsimile device, B the computer, 10 a facsimile control unit, 20 an image scanner, 30 a modem and network control unit, 40 an image printer, 50 a computer interface unit, 60 a computer main control unit, 70 an external memory unit, 80 a key board, 90 a monitor, and 100 a RS232C interface unit, respectively.

As shown in FIG. 1, the facsimile device(A) is composed of the image scanner 20 inputting an image information, the image printer 40 printing out the image information, the modem and network control unit 30 sending and receiving the image information to and from the network line, the facsimile control unit 10 controlling generally the system operation, and the computer interface unit 50 connecting the facsimile device and the computer.

The computer system(B) is composed of the computer main control unit 60 corresponding to generally the computer body, the external memory unit 70 storing the image information as the floppy disc driver(FDD) or the hard disc driver(HDD), the key board 80 inputting the document and control information, the monitor 90 displaying the image information, and the RS232C interface unit 100 connecting the computer to other equipments.

The interface system in this invention can be formed by adopting the parallel interface using GPIB(General Purpose Interface Bus), and however adopts the asynchronous serial interface using the RS232C interface.

Figure 2:
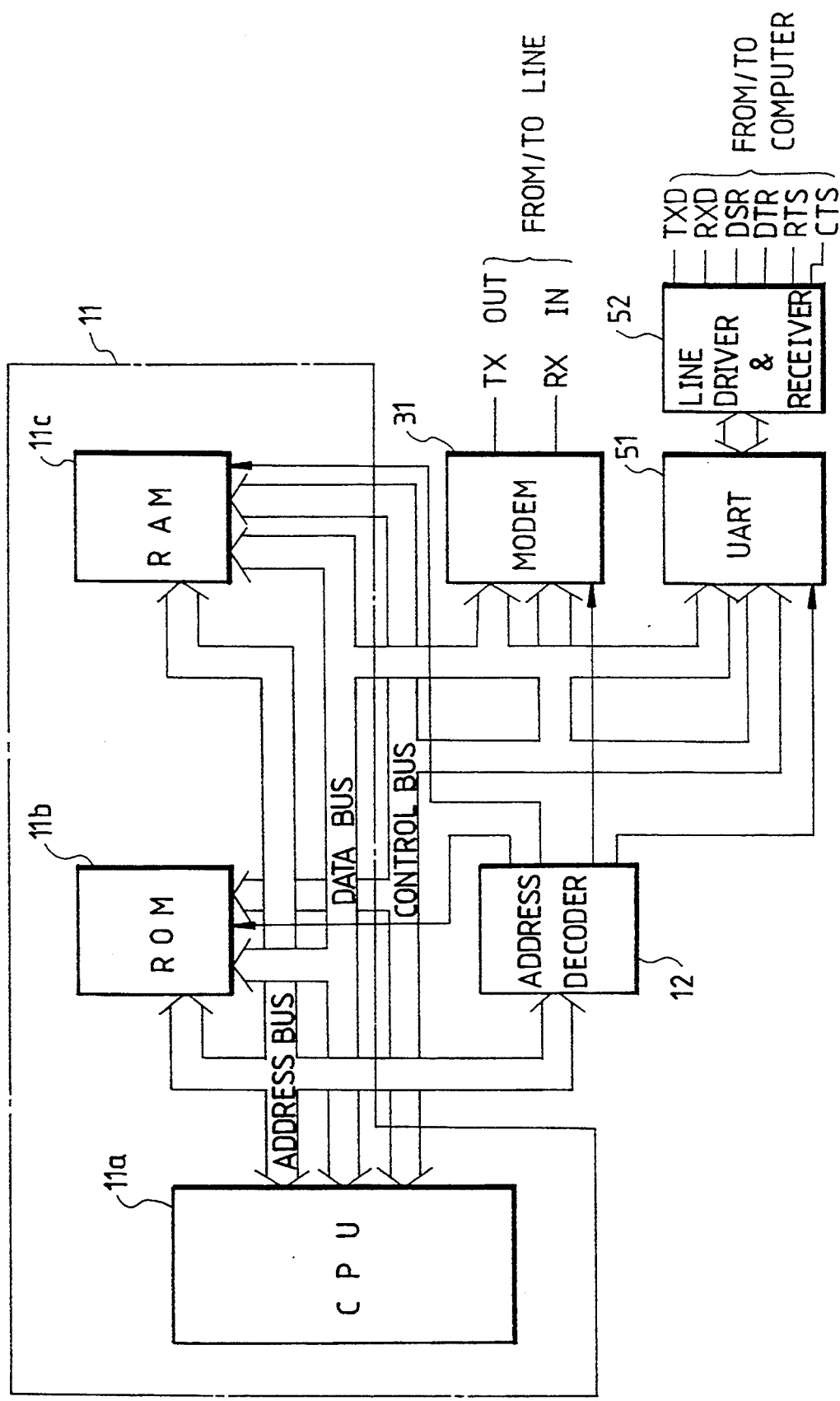
FIG. 2 is a schematic diagram of the major parts of FIG. 1.

FIG. 2 is a schematic diagram of an embodiment of the major parts of the facsimile device, and in FIG. 2, the reference number 11 shows a control and memory unit, 11a shows CPU(Central Processing Unit), 11b ROM(Read Only Memory), 11c RAM(Random Access Memory), 12 an address decoder, 31 a modem, 51 UART(Universal Asynchronous Receiver Transmitter), and 52 a line driver and receiver.

The UART 51 is used for processing effectively the RS232C connection to and from the computer. In the embodiment, the control and memory unit 11 and the UART 51 are connected in series for processing effectively the image information being transmitted to the communication line and the image information and the character information being transmitted to the computer.

The CPU 11a of the control and memory unit 11 is a processing unit for controlling the general operation of the facsimile device, and the ROM 11b is connected to the CPU 11a by the address bus, the data bus, and the control bus. The ROM 11b is composed of the 256k EPROM in this embodiment as the expansive memory, but can be separately composed of the program ROM and the font ROM. The RAM 11c is connected to the CPU 11a by the address bus, the data bus and the control bus, and is composed of the 256k SRAM as the expansive memory. The CPU 11a, the ROM 11b, and the RAM 11c can be replaced with one chip CPU in other embodiments, and at this time, in case of requiring the additive buffer memory, the RAM can be used additively.

The modem 31 is connected to the data bus and the control bus and performs the connection function to and from the communication line. The UART 51 is connected to the data bus and the control bus and performs the connection function to and from the computer.

The address decoder 12 is connected to the address bus at the input terminal thereof, and to the ROM, the RAM, the modem and the UART at the output terminal thereof, and then selects the ROM, the RAM, the modem or the UART according to the value of the address.

The line driver and receiver 52 performs the voltage transformation for connecting to the RS232C interface unit 100 the computer. The line driver and receiver 52 comprises the 1488 or 1489 IC, providers the voltage 12V with the RS232C interface unit of the computer after transforming the output voltage(0V,5V) from the UART 51 to the voltage 12V, or provides the voltage(0V, 5V) with the UART 51 after transforming the output voltage from the RS232C interface unit to the voltage (0V,5V).

The CPU 11a of the control and memory unit 11 alternatively checks and detects the state of the modem 31 and the UART 51 by controlling periodically the chip selection of the address decoder 12, and then processes the requirement of the particular control information that decides to send the image information through the modem 31 or through the UART 51. Accordingly, an interrupt is used in transmitting said information, and when the requirement of said information transmission is produced at the same time, the information to and from the communication line is processed preferentially.

Each signal terminal of the computer interface unit 50 uses TXD, RXD, DSR, DTR, RTS, CTS, GND terminals recommended in CCITT V24, and its wiring technique in 25 pins RS232C port or 9 pins RS232C port is shown at the following TABLE 1.

TABLE 1

| 25 pins RS232C port | | 9 pins RS232C port | |
|---|---|---|---|
| FACSIMILE | COMPUTER | FACSIMILE | COMPUTER |
| TXD(2) | — RXD(3) | TXD(2) | — RXD(2) |
| RXD(3) | — TXD(2) | RXD(3) | — TXD(3) |
| DSR(4) | — DTR(20) | DSR(4) | — DTR(4) |
| DTR(6) | — DSR(6) | DTR(6) | — DSR(6) |
| CTS(7) | — RTS(4) | CTR(7) | — RTS(7) |
| RTS(8) | — CTS(5) | RTS(8) | — CTS(8) |
| GND(5) | — GND(7) | GND(5) | — GND(5) |

Generally, the image information exchange between the facsimile device and the computer is operated according to the image scanning mode(SCAN MODE), the image print mode(PRINT MODE), the system transmitting mode (SYSTEM TX MODE), the system received mode (SYSTEM RX MODE), the facsimile transmitting mode (FAX TX MODE), the facsimile received mode (FAX RX MODE), the copy mode (COPY MODE), the image display mode (DISPLAY MODE), etc., and substantially the image scanning mode, the image print mode, the system transmitting mode and the system received mode have a direct affect on said exchange.

The image scanning mode (SCAN MODE) performs the coding for the inputted image from the image scanner 20 of the facsimile device, registers the coded information at the index file after transmitting it to the computer, and then stores it at the image information file within the memory unit 70 of the computer as the facsimile format (FAX FORMAT).

The image print mode(PRINT MODE) transmits the image information file stored at the memory unit 70 to the image printer 40, performs the decoding to the bit mapped image data, and then prints them.

The system transmitting mode (SYSTEM TX MODE) sends directly the image information file (FAX FORMAT) stored at the memory unit 70 to the other system through the modem and network control unit 30, and at this time, the operation between the facsimile device and the communication line is performed according to the facsimile protocol.

The system received mode (SYSTEM RX MODE) registers the image information received through the facsimile device at the index file of the computer directly, and then stores it at the image information file within the memory unit 70.

The facsimile transmitting mode (FAX TX MODE) performs the coding for the image information inputted in the facsimile device, and then sends out it through the transmission unit of the facsimile device.

The facsimile received mode (FAX RX MODE) performs the decoding for the image information received in the facsimile device, and then prints it at the image printer.

The copy mode (COPY MODE) prints, at the image printer, the image information inputted in the facsimile device.

The image display mode (DISPLAY MODE) performs the decoding for the required image information file, and then displays the bit image data on the monitor of the computer.

The file convert mode (FILE CONVERT MODE) converts the character file (ASCII FORMAT) to the image information file (FAX FORMAT).

In said PRINT MODE and SYSTEM TX MODE, the character file (ASCII FORMAT) stored in the computer is stored at the image information file by the font file, and then is outputted.

As shown in above description, the image information exchange between the facsimile device and the computer is operated according to said four modes, and each mode requires the control information for protocol control.

Figure 3:
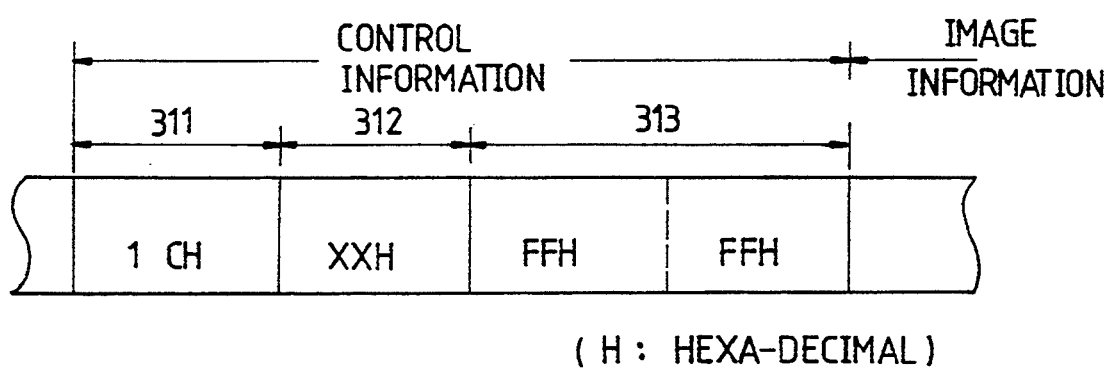
FIG. 3 is a construction diagram of the control information format.

FIG. 3 is a construction diagram of the control information format being composed of four bytes, and in FIG. 3, the reference number 311 shows a head code, 312 a control code, and 313 a control end code being composed of two bytes, respectively.

The head code 311 showing the start of the control information is composed of "1CH" ("H" means a hexadecimal number) so that it can have a difference from the output information corresponding to the printer.

The control code 312 showing the kind of control expresses the operation mode establishing the flow direction of the image information, the input and output mode (DOCUMENT MODE) of the image information, the end of the image information, and the states of each device. That kind and function is shown at following TABLE 2,3,4, and 5.

TABLE 2

| <control information for establishing operation mode> | | | | |
|---|---|---|---|---|
| CONTROL INFORMATION | DATA | FROM | TO | FUNCTION |
| SCNREQ | 80H | PC | FAX | Command of start of the input of the image information to be stored |
| SCNRDY | 81H | FAX | PC | Showing of end of preparation starting the input |
| PRTREQ | 82H | PC | FAX | Command of start of the image information to be stored |
| PRTRDY | 83H | FAX | PC | Showing of end of preparation starting the print |
| TXREQ | 84H | PC | FAX | Command of start of the image information to be sent |
| TXRDY | 85H | FAX | PC | Showing of end of preparation starting the sending |
| RXREQ | 86H | FAX | PC | Command of start of the image information sending |
| RXRDY | 87H | PC | FAX | End of the storing preparation of the image information to be received |

TABLE 3

CONTROL INFORMATION FOR ESTABLISHING MANUSCRIPT MODE (X,Y=FAX or PC)

| CONTROL INFORMATION | DATA | FROM | TO | FUNCTION |
|---|---|---|---|---|
| MODSTD | 90H | X | Y | Input/output image information to 200*100 DPI |
| MODDTL | 91H | X | Y | Input/output image information to 200*200 DPI |
| MODHFT | 92H | X | Y | Input/output image information to picture mode |
| MODTXT | 93H | PC | FAX | Showing character information (ASCII) |
| MODACK | 94H | Y | X | End of establishment to manuscript mode |

TABLE 4

END CONTROL INFORMATION OF IMAGE INFORMATION (X,Y=FAX OR PC)

| CONTROL INFORMATION | DATA | FROM | TO | FUNCTION |
|---|---|---|---|---|
| ENDPAG | 8AH | X | Y | Showing last page of image information |
| ENDFIL | 8BH | X | Y | Showing last file of image information |
| ENDACK | 8CH | Y | X | Showing end of receiving of image information |

TABLE 5

RESPONSE CONTROL INFORMATION IN ERROR (X,Y=FAX OR PC)

| CONTROL INFORMATION | DATA | FROM | TO | FUNCTION |
|---|---|---|---|---|
| ABORT | 8DH | Y | X | Denial response for received control information |
| ERRMES | 8EH | Y | X | Error occurrence in performing received control information |
| RESREQ | 8FH | Y | X | Require re-sending of received image information |

In TABLES 3, 4 and 5, the reference symbols X and Y show that the sending of the control information is not fixed to the facsimile device or the computer, X means one device starting the sending of the operation mode, and Y means one device deciding the operation mode to the receiving device.

The control end code shows the end of control information and uses "FFH" of two bytes to have a difference from the image information.

What is claimed is:

1. An apparatus for generating a control signal used in image information transmission in a system combining a facsimile device and a computer, comprising:
    head code means for producing a head code of one byte, said head code indicating a start of the control information;
    control cods means for producing a control code of one byte located Just after the head code, said control code being one of operation mode control information, manuscript mode control information, end control information, and response control information for error, for showing the kind of control; and
    control end code means for producing a control end code of two bytes located just after the control code, said control end code indicating an end of the control information.

2. An apparatus according to claim 1, wherein the head code comprises "1C" where H indicates a hexadecimal number.

3. An apparatus according to claim 2, wherein the control end code comprises "FFH" of one byte and "FFH" of one byte.

4. An apparatus for generating a control signal used in image information transmission in a system combining a facsimile device and a computer, comprising:
    head code means for producing a head code of one byte, said head code indicating a start of the control information;
    control code means for producing a control code of one byte located Just after the head code, said control code containing operation mode control information; and
    control end code means for producing a control end code of two bytes just after the control code, said control end code indicating an end of the control information.

5. An apparatus for generating a control signal used in image information transmission in a system combining a facsimile device and a computer, comprising:
    head code means for producing a head code of one byte, said head code indicating a start of the control information;
    control code means for producing a control code of one byte located Just after the head code, said control code containing manuscript mode information; and
    control end code means for producing a control end code of two bytes located just after the control code, said control end code indicating an end of the control information.

* * * * *